United States Patent
Gitlin et al.

(10) Patent No.: US 6,188,718 B1
(45) Date of Patent: Feb. 13, 2001

(54) METHODS AND APPARATUS FOR REDUCING COCHANNEL INTERFERENCE IN A MIXED-RATE COMMUNICATION SYSTEM

(75) Inventors: Richard Dennis Gitlin, Little Silver; Howard C. Huang; Laurence Eugene Mailaender, both of Hoboken; Reinaldo A. Valenzuela, Holmdel, all of NJ (US)

(73) Assignee: Lucent Technologies Inc., Murray Hill, NJ (US)

(*) Notice: Under 35 U.S.C. 154(b), the term of this patent shall be extended for 0 days.

(21) Appl. No.: 09/138,465

(22) Filed: Aug. 21, 1998

(51) Int. Cl.$^7$ ........................................ H04B 1/10
(52) U.S. Cl. ..................... 375/148; 375/347; 375/349; 455/273; 455/278.1
(58) Field of Search .................... 375/144, 148, 375/267, 347, 349; 370/317, 320, 335, 342; 455/553, 137, 140, 273, 278.1

(56) References Cited

U.S. PATENT DOCUMENTS

| | | | |
|---|---|---|---|
| 5,844,951 | * 12/1998 | Proaks et al. | 375/347 |
| 6,014,413 | * 1/2000 | Golden et al. | 375/347 |
| 6,091,760 | * 7/2000 | Giallorenzi et al. | 375/140 |

OTHER PUBLICATIONS

Lal C. Godara, "Applications of Antenna Arrays to Mobile Communications, Part II: Beam–Forming and Direction–of–Arrival Considerations," Proc. of IEEE, V. 85, No. 8, 1195–1245 (Aug. 1997).

Alexandra Duel–Hallen et al., "Multiuser Detection for CDMA Systems," IEEE Personal Communications, 46–58 (Apr. 1995).

Ryuji Kohno et al., "Combination of an Adaptive Array Antenna and a Canceller of Interference for Direct–Sequence Spread–Spectrum Multiple–Access System," IEEE Journal On Selected Areas in Communications, vol. 8, No. 4, 675–81 (May 1990).

* cited by examiner

Primary Examiner—Amanda T. Le
(74) Attorney, Agent, or Firm—Ryan, Mason, & Lewis, LLP

(57) ABSTRACT

A method and apparatus for increasing system capacity in a mixed-rate wireless communication are disclosed. Improvements are obtained using multiuser detection or antenna array processing techniques or both to explicitly cancel or attenuate only the high power users. Multiuser detection may be combined with antenna array processing to recover capacity appropriated by the high-power users. By mitigating the interference effects of only the high-powered users, the computational burden is manageable. An antenna array algorithm or a multiuser detection algorithm or both, are applied only to n high rate users (n<k total users). In an antenna array processing implementation, fewer antennas may be employed (one for each high-rate user). In a multiuser detection implementation, fewer cancellation stages may be employed (one for each high-rate user).

26 Claims, 4 Drawing Sheets

METHODS AND APPARATUS FOR REDUCING COCHANNEL INTERFERENCE IN A MIXED-RATE COMMUNICATION SYSTEM

FIELD OF THE INVENTION

The present invention relates to wireless communication systems, and more particularly, to methods and apparatus for reducing cochannel interference in a wireless communication system.

BACKGROUND OF THE INVENTION

Code division multiple access (CDMA) techniques have been employed in many digital wireless communication systems to permit a large number of system users to communicate with one another. Current CDMA networks were designed to carry only voice traffic and exhibit limited data rate variability. Thus, in conventional CDMA systems, users generally have similar bit rates and power levels.

CDMA systems treat each user as a separate signal, while treating the other users as either interference or noise. As the number of interfering users increases, the corresponding interferences add to cause degradation of performance, such as an increasing bit error rate (BER) or frame error rate. In a CDMA system, some users may be received at such high signal levels that a lower power user may be swamped out, referred to as the "near/far effect." In other words, users near the receiver are received at higher powers than those far away, and those further away suffer a degradation in performance. CDMA systems attempt to mitigate the near/far effect by employing power control to ensure that all users are received with equal power.

In theory, potentially significant capacity increases and near/far resistance can be achieved if the negative effects that each user has on each other can be cancelled. Of course, the performance improvements must be balanced with the attendant increases in system complexity. Multiuser detection and antenna array processing techniques have been suggested for use in CDMA systems to mitigate the negative effects that all users have on each other. Antenna array processing techniques mitigate the effects of different users by compensating for phase and delay effects. Multiuser detection algorithms, on the other hand, cancel interference in the time domain.

Since all the users in a conventional CDMA system generally have similar bit rates and power levels, and therefore contribute approximately the same degree of interference, the processing resources of an adaptive antenna array algorithm and a multiuser detection algorithm must be allocated among all the users. The complexity of both multiuser detection and antenna array processing is proportional to the number of users to be nulled. Thus, the computational burden of implementing an adaptive antenna array algorithm or a multiuser detection algorithm for all users is burdensome, and a number of suboptimal techniques have been implemented.

CDMA networks, however, are evolving to encompass a variety of multimedia applications, each having potentially different data rates. Thus, CDMA networks will be required to carry information associated with the various multimedia applications at various data rates, corresponding to the requirements of diverse wireless services demanded by customers. For example, CDMA networks will carry voice information characterized by low data rates and data information, including multimedia information, characterized by higher data rates. While interference in conventional (single-rate) CDMA systems is generally assumed to resemble Gaussian noise and be uniform in space, these assumptions do not hold in an environment having mixed rate traffic, where different users have different data rates.

Since the power level of a received signal increases in proportion to the bit rate (to achieve constant energy-per-bit, $E_b$), signals having different power levels will be received on a channel having mixed rate traffic. The high-power users cause significant interference to the low-power users, reducing the overall system capacity (number of users). In a system with mixed-rate traffic, a small subset of high-powered users is responsible for a large fraction of the total received power.

SUMMARY OF THE INVENTION

Generally, a mixed-rate CDMA communication system is disclosed that efficiently increases system capacity. The present invention permits such performance improvements using multiuser detection or antenna array processing techniques or both to explicitly cancel or attenuate only the high power users. The present invention distinguishes between two broad categories of users: voice users characterized by low data rates and power levels and data users, including multimedia users, characterized by high data rates and power levels. In one embodiment, the present invention combines multiuser detection with antenna array processing to recover capacity appropriated by the high-power users. By mitigating the interference effects of only the high-powered users, the computational burden is manageable, and the total number of users may be increased.

In accordance with one aspect of the invention, the antenna array algorithm or the multiuser detection algorithm or both, are applied only to n high rate users (n<k total users). The present invention allows antenna array processing or multiuser detection or both to be beneficially and manageably employed, without an unwieldy computational burden. In an antenna array processing implementation, fewer antennas may be employed (one for each high-rate user). In a multiuser detection implementation, fewer cancellation stages may be employed (one for each high-rate user).

DETAILED DESCRIPTION

Figure 1:
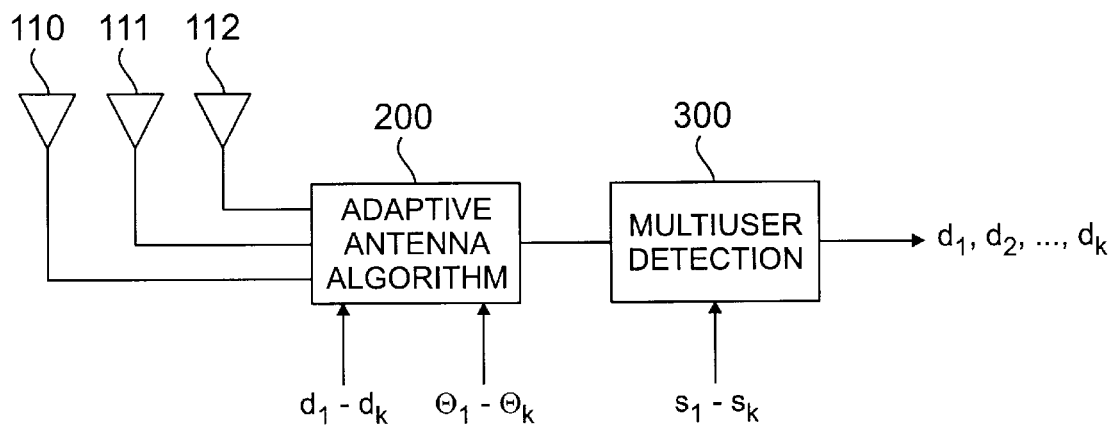
FIG. 1 is a block diagram of a space-time multiuser receiver in a conventional single-rate wireless communication system.

The present invention relates to a method and apparatus for mitigating the negative effects that high-rate users have on each other and on all other users in a mixed-rate CDMA system. FIG. 1, discussed below, shows a conventional single-rate multi-user receiver 100 that uses antenna array processing 200 and multiuser detection 300 to cancel the effects of each user. The present invention utilizes an antenna array algorithm or a multiuser detection algorithm or both to efficiently recover capacity appropriated by only the high-power users. In accordance with a feature of the present invention, the antenna array algorithm (FIG. 5) or the multiuser detection algorithm (FIG. 6) or both (FIG. 7), are applied only to the n high rate users.

ANTENNA ARRAY PROCESSING

Figure 2:
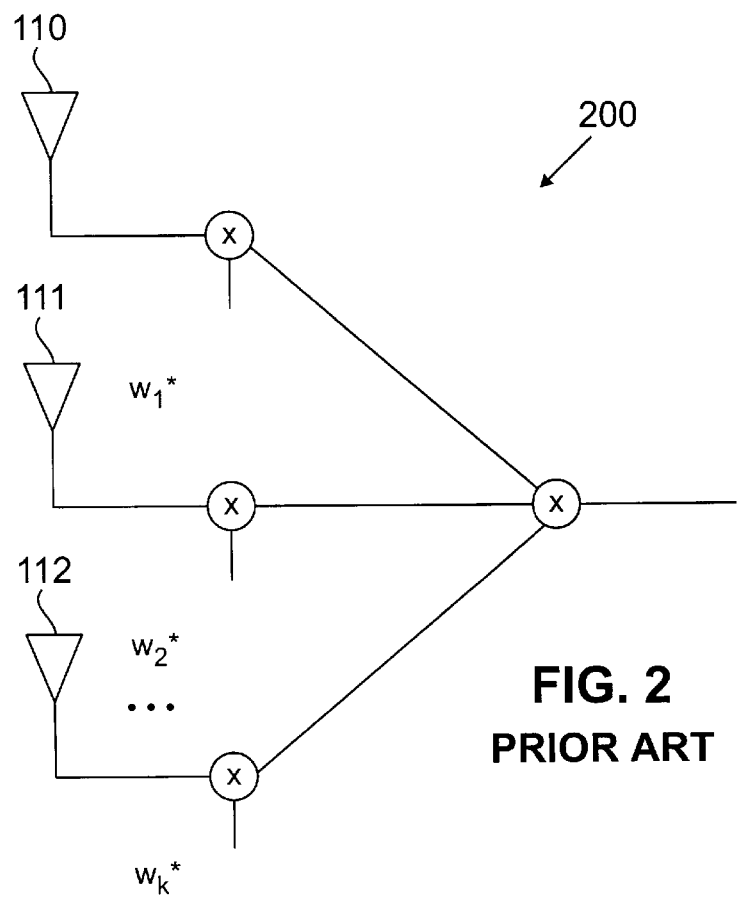
FIG. 2 is a schematic block diagram of an illustrative conventional antenna array processor of FIG. 1.

As shown in FIG. 1, signals from multiple antennas 110–112 are combined in a conventional manner using an adaptive antenna array algorithm 200 to mitigate interference in the spatial dimension. As previously indicated, antenna array processing techniques mitigate the effects of different users by compensating for phase and delay effects. A number of antenna array processing techniques have been proposed or suggested for CDMA systems by both the academic and commercial communities. One illustrative implementation of an antenna array processor 200 is shown in FIG. 2. The adaptive antenna array algorithm 200, for example, may make use of training sequences ($d_l$ through $d_k$) or directions of arrival ($\theta_l$ through $\theta_k$) for all the users, in a known manner. Generally, as shown in FIG. 2, antenna array processing techniques utilize a linear combination of the signals received by each antenna 110–112, weighted using a complex weighting coefficient ($w_l$ through $w_k$), to point each antenna at a specific user and thereby cancel out all other users. Assuming the directions of arrival ($\theta_l$ through $\theta_k$) for each of the interfering sources, s, are known, then a matrix of their spatial signatures may be found:

$$A = [s(\theta_1), s(\theta_2), \ldots s(\theta_k)]$$

Then, by defining a unit vector, $e_1$, the zero-forcing weights are obtained in a known manner by:

$$w^H = e_1^T A^H (AA^H)^{-1}.$$

Thus, to implement the zero-forcing algorithm, $w_k$ must be computed, and the complexity of the computation depends on the number of antennas. In addition, the number of antennas depends on the number of sources to be cancelled. For a more detailed discussion of adaptive antenna array processing, see, for example, Lal Godara, Application of Antenna Arrays to Mobile Communications, Part II: Beam Forming and Direction-of-Arrival Considerations, Proc. of IEEE, Vol. 85, No. 8 (August 1997), incorporated by reference herein.

MULTIUSER DETECTION

Figure 3:
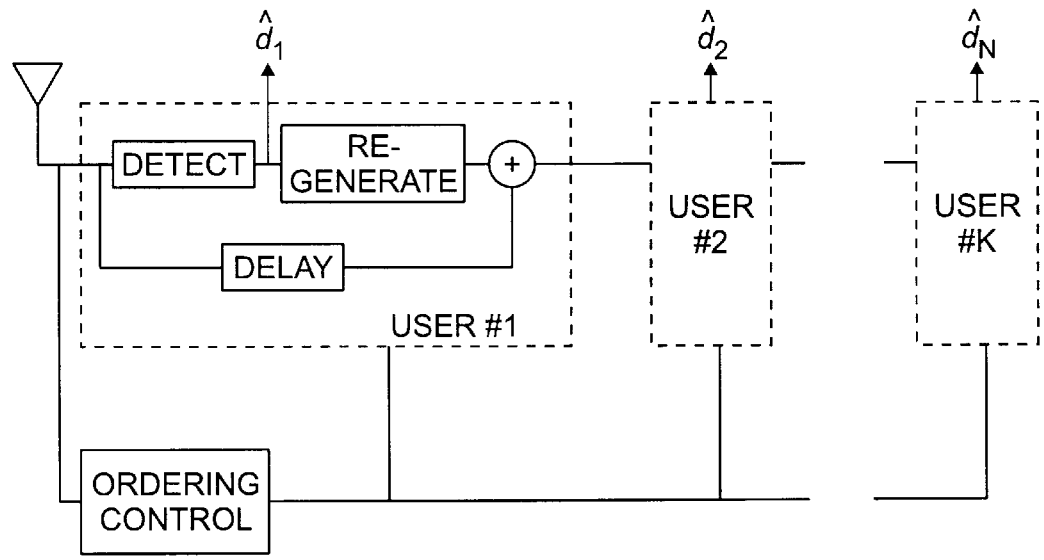
FIG. 3 is a schematic block diagram of an illustrative conventional multiuser detector of FIG. 1.

The conventional receiver 100 of FIG. 1 also includes a multiuser detection algorithm 300 to cancel interference in the time domain. Multiuser detection techniques recognize that each user has a characteristic shape (or spreading code), $s_1$ through $s_k$, that is known to the base station. One implementation of a multiuser detection technique, known as a successive interference canceller 300, is shown in FIG. 3. A conventional successive interference canceller 300 contains a detect/regenerate/subtract (DRS) unit 310 in series for each of k users, and an ordering controller 320. A successive interference canceller 300 estimates the signal, $d_n$, for a single user and then subtracts the estimated signal, $d_n$, from the remaining signal. The signal estimate, $d_n$, is obtained using a matched filter corresponding to the users' characteristic shape. Thus, for a user corresponding to the final stage, a clear signal is obtained because the interference of all prior users has been removed. The ordering controller 320 orders the users by power level, and then successively removes each user from the highest to lowest power levels. For a more detailed discussion of conventional multiuser detection techniques, see, for example, Alexandra Duel-Hallen et al., "Multiuser Detection for CDMA Systems," IEEE Personal Communications, 46–58 (April 1995), incorporated by reference herein. An example of a system employing both multiuser detection and adaptive antenna arrays is given by Ryuji Kohno et al., "Combination of an Adaptive Array Antenna and a Canceller of Interference for Direct-Sequence Spread-Spectrum Multiple-Access System," IEEE Journal On Selected Areas in Communications, Vol. 8, No. 4, 675–81 (May 1990), incorporated by reference herein.

Although the adaptive antenna array algorithm 200 and the multiuser detection algorithm 300 are shown as disjoint and consecutive in FIG. 1, they may be integrated in a single algorithm, or implemented independently, as would be apparent to a person of ordinary skill in the art.

Figure 4:
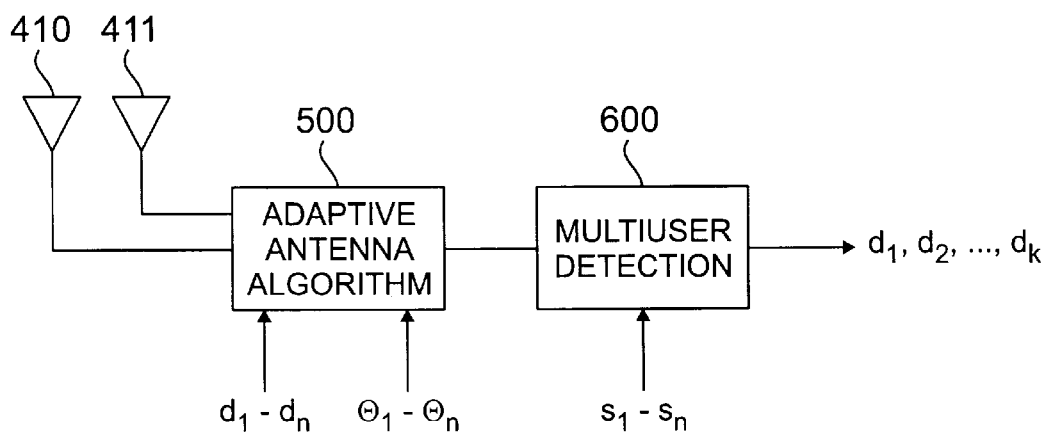
FIG. 4 is a block diagram of a receiver in a wireless communication system in accordance with the present invention.

FIG. 4 shows a receiver 400 in accordance with the present invention that combines an antenna array algorithm 410 with a multiuser detection algorithm 420 to efficiently recover capacity appropriated by n high-power users. As shown in FIG. 4, signals from a total of k users are received by antennas 410–411. Of the k users, n are high rate users (k>n), such as data users, and the remaining k−n users are low-rate users, such as voice users. In accordance with a feature of the present invention, the antenna array algorithm (FIG. 5) or the multiuser detection algorithm (FIG. 6) or both (FIG. 7), are applied only to the n high rate users.

In this manner, antenna array processing or multiuser detection or both may be beneficially and manageably employed, without an unwieldy computational burden. For example, in an antenna array processing implementation, fewer antennas may be employed (one for each high-rate user). Likewise, in a multiuser detection implementation, fewer cancellation stages may be employed (one for each high-rate user). For the illustrative implementation shown in FIG. 4, the antenna array processing system 410 trains nulls only in directions $\theta_1$ through $\theta_n$, corresponding to the high rate users, and the multiuser detector 420 makes use of only the signature sequences, $s_1$ through $s_n$, corresponding to the high rate users.

Figure 5:
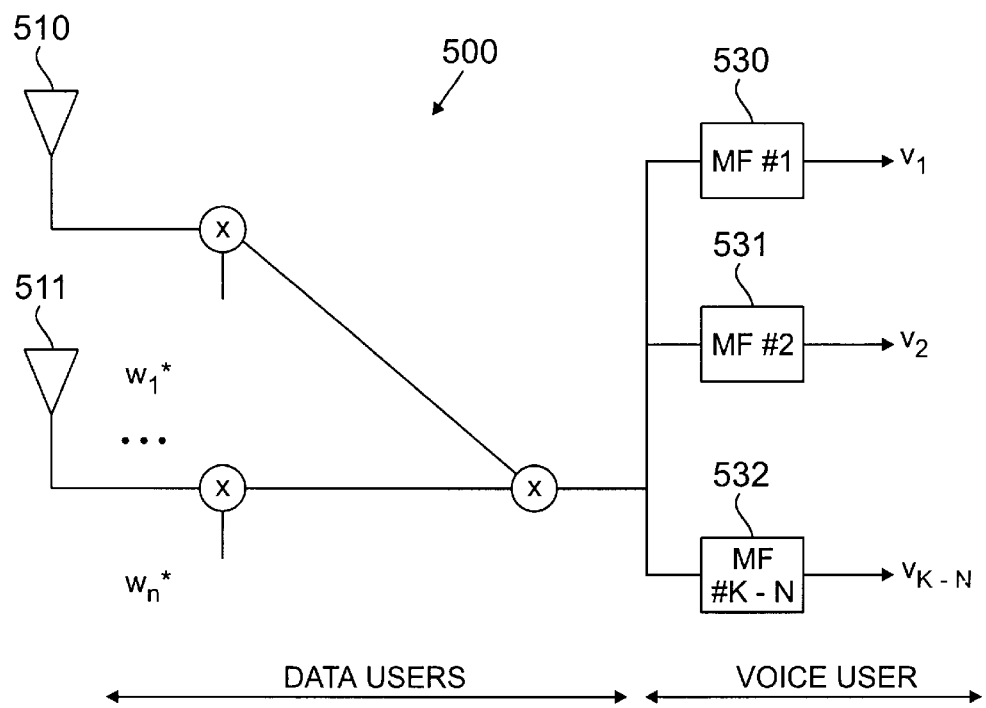
FIG. 5 is a schematic block diagram of an illustrative antenna array processor that attenuates only high-rate users in the space domain in accordance with the present invention.

FIG. 5 shows an illustrative mixed-rate receiver 500 that attenuates only high-rate users in the space domain in accordance with the present invention. The mixed-rate receiver 500 utilizes antenna array processing to mitigate the effects that n high power users have on each other and on all other k users. The receiver 500 utilizes a linear combination of the signals received by each antenna 510–511 corresponding to the high rate users, weighted using a complex weighting coefficient ($w_1$ through $w_n$), to point each antenna null at a specific high-rate user and thereby cancel out a small number of high-rate data users. The signal, $d_n$, of the high rate users are estimated. Since n<k, the computations are simplified and performance is improved as the size of the corresponding interference subspace is minimized. Thereafter, k−n matched filter detectors 530–532 detect the signals corresponding to the remaining k−n low rate users. Since the total received power attributed to the n high-powered users has been subtracted out, the remaining signals corresponding to the remaining k−n low rate users can be detected with conventional matched filter detectors 530–532. The antenna processing may thus cancel a small number of high-rate users (perhaps less than n users). Thus, fewer antennas and less computational complexity are required relative to the conventional implementation shown in FIG. 2. With the high-rate users attenuated purely in the spatial domain, the lower rate voice users are detected with ordinary matched filters.

Figure 6:
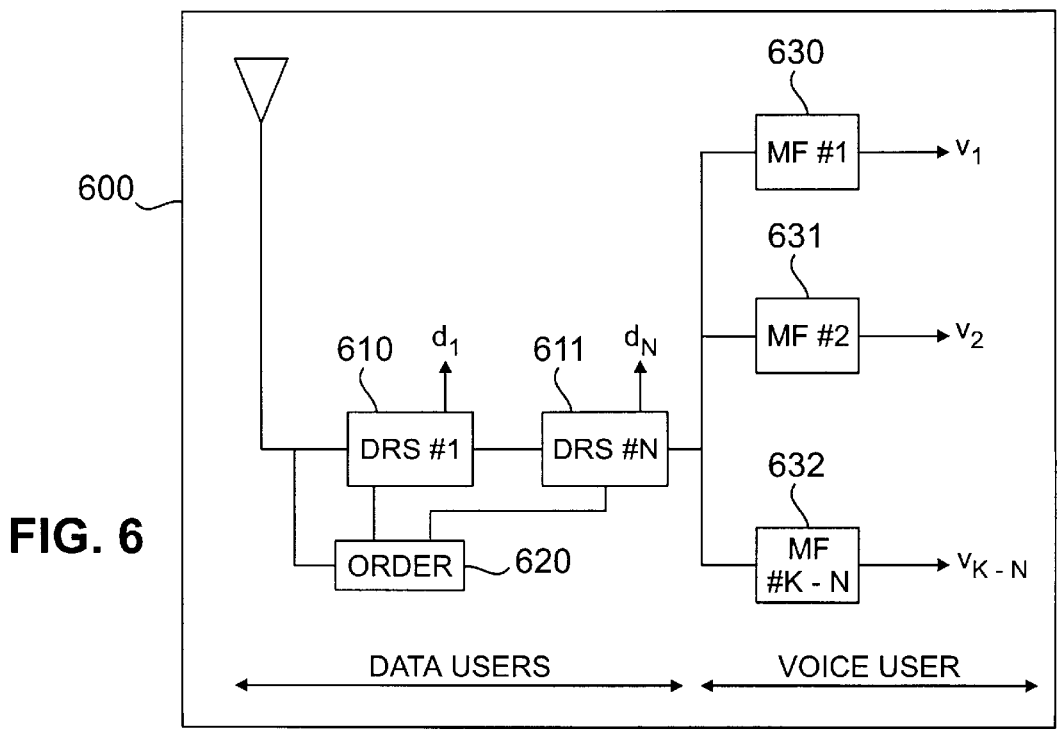
FIG. 6 is a schematic block diagram of an illustrative multiuser detector that attenuates only high-rate users in the time domain in accordance with the present invention.

FIG. 6 shows an illustrative successive interference canceller (SIC) mixed-rate receiver 600 that attenuates only high-rate users in the time domain in accordance with the present invention. The mixed-rate receiver 600 utilizes multiuser detection to mitigate the effects that n high power users have on each other and on all other k users. The receiver 600 includes n detect/regenerate/subtract (DRS) cancellation stages 610–611, in series for each of the n high rate users, an ordering controller 620 and k−n matched filter detectors 630–632 for detecting the signals corresponding to the remaining k−n low rate users. Each DRS cancellation stage 610–611 estimates the signal, $d_n$, for a single high-rate user and then subtracts the estimated signal, $d_n$, from the remaining signal. The signal estimate, $d_n$, is obtained using a matched filter corresponding to the high-rate users' characteristic shape, $s_1$ through $s_n$. The ordering controller 620 orders the high rate users by power level, and then successively removes each n high rate user from the highest to lowest power levels. Thereafter, the k−n matched filter detectors 630–632 detect the signals corresponding to the remaining k−n low rate users. Since the total received power attributed to the n high-powered users has been subtracted out by the n detect/regenerate/subtract (DRS) cancellation stages 610–611, the remaining signals corresponding to the remaining k−n low rate users can be detected with conventional matched filter detectors 630–632.

Figure 7:
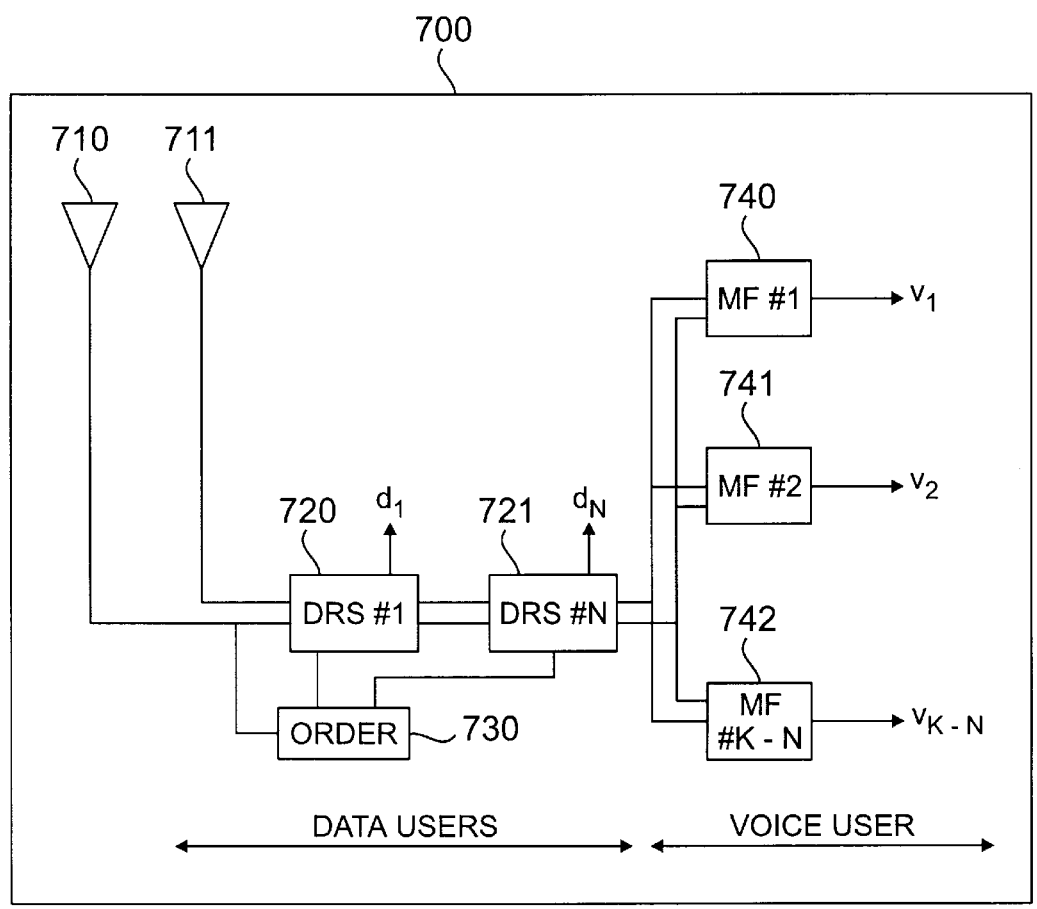
FIG. 7 is a schematic block diagram of an illustrative wireless receiver that attenuates only high-rate users in both the space and time domains in accordance with the present invention.

FIG. 7 shows an illustrative mixed-rate receiver 700 that attenuates only high-rate users in both the space and time domains in accordance with the present invention. As shown in FIG. 7, the high-rate data users are attenuated in space and time, and each detect/regenerate/subtract (DRS) cancellation stage 720–721 employs all the antenna signals received by antennas 710–711. The antenna weightings may correspond to the zero forcing solution discussed above, so that all but one data source is cancelled, or to more traditional maximal ratio combining (MRC). Each DRS cancellation stage 720–721 estimates the signal, $d_n$, for a single high-rate user and then subtracts the estimated signal, $d_n$, from the remaining signal. The signal estimate, $d_n$, is obtained using a matched filter corresponding to the high-rate users' characteristic shape, $s_1$ through $s_n$. The ordering controller 730 orders the high rate users by power level, and then successively removes each n high rate user from the highest to lowest power levels. Lower rate voice users are detected by ordinary matched filters 740–742 with the multiple antenna signals combined via MRC, or some other technique.

It is to be understood that the embodiments and variations shown and described herein are merely illustrative of the principles of this invention and that various modifications may be implemented by those skilled in the art without departing from the scope and spirit of the invention.

We claim:

1. A method for receiving a signal in a mixed-rate communication system, said communication system having at least one high-rate user and a plurality of low-rate users, said method comprising the steps of:
   identifying said high-rate user; and
   reducing the interference effects only for said at least one high-rate user.

2. The method according to claim 1, wherein said reducing step comprises the step of applying a multiuser detection technique only for said at least one high-rate user.

3. The method according to claim 1, wherein said reducing step comprises the step of applying an antenna array processing technique only for said at least one high-rate user.

4. The method according to claim 1, wherein said at least one high-rate user is a data user.

5. The method according to claim 1, wherein said low-rate users are voice users.

6. The method according to claim 1, wherein said reducing step produces a remaining signal that reduces the interference effects of said high-rate users and said method further comprising the step of decoding said remaining signal for said low-rate users.

7. The method according to claim 6, wherein said detector is a matched filter detector.

8. A method for receiving a signal in a mixed-rate communication system, said communication system having at least one high-rate user and a plurality of low-rate users, said method comprising the steps of:
   processing said signal with an antenna array processing technique only for said at least one high-rate user, said processing step producing a remaining signal that reduces the effects of said high-rate user; and
   decoding said remaining signal for said low-rate users.

9. The method according to claim 8, wherein said processing step further comprises the step of applying a multiuser detection technique only for said at least one high-rate user.

10. The method according to claim 8, wherein said at least one high-rate user is a data user.

11. The method according to claim 8, wherein said low-rate users are voice users.

12. The method according to claim 8, wherein said decoding step utilizes a matched filter detector.

13. A method for receiving a signal in a nixed-rate communication system, said communication system having at least one high-rate user and a plurality of low-rate users, said method comprising the steps of:
   processing said signal with a multiuser detection technique only for said at least one high-rate user, said processing step producing a remaining signal that reduces the effects of said high-rate user; and
   decoding said remaining signal for said low-rate users.

14. The method according to claim 13, wherein said processing step further comprises the step of applying an antenna array processing technique only for said at least one high-rate user.

15. The method according to claim 13, wherein said high-rate user is a data user.

16. The method according to claim 13, wherein said low-rate users are voice users.

17. The method according to claim 13, wherein said decoding step utilizes a matched filter detector.

18. The method according to claim 13, wherein said multiuser detection technique is a successive interference canceller (SIC).

19. A method for receiving a signal in a mixed-rate communication system, said communication system having at least one high-rate user and a plurality of low-rate users, said method comprising the steps of:
   processing said signal with an antenna array processing technique only for said at least one high-rate user;
   processing said signal with a multiuser detection technique only for said at least one high-rate user, said processing steps producing a remaining signal that reduces the effects of said high-rate user; and detecting said remaining signal for said low-rate users.

20. A receiver for receiving a signal in a mixed-rate communication system, said communication system having at least one high-rate user and a plurality of low-rate users, said receiver comprising:

a processor that processes said signal with an antenna array processing technique only for said at least one high-rate user, said processor producing a remaining signal that reduces the effects of said high-rate user; and one or more detectors for decoding said remaining signal to detect said low-rate users.

21. A receiver for receiving a signal in a mixed-rate communication system, said communication system having at least one high-rate user and a plurality of low-rate users, said receiver comprising:

a processor that processes said signal with a multiuser detection technique only for said at least one high-rate user, said processor producing a remaining signal that reduces the effects of said high-rate user; and one or more detectors for decoding said remaining signal to detect said low-rate users.

22. A receiver for receiving a signal in a mixed-rate communication system, said communication system having at least one high-rate user and a plurality of low-rate users, said receiver comprising:

one or more processors that processes said signal with an antenna array processing detection technique and a multiuser detection technique only for said at least one high-rate user, said processors producing a remaining signal that reduces the effects of said high-rate user; and one or more detectors for decoding said remaining signal to detect said low-rate users.

23. A receiver for receiving a signal in a mixed-rate communication system, said communication system having at least one high-rate user and a plurality of low-rate users, said receiver comprising:

means for processing said signal with an antenna array processing detection technique only for said at least one high-rate user, said means for processing producing a remaining signal that reduces the effects of said high-rate user; and means for decoding said remaining signal to detect said low-rate users.

24. A receiver for receiving a signal in a mixed-rate communication system, said communication system having at least one high-rate user and a plurality of low-rate users, said receiver comprising:

means for processing said signal with a multiuser detection technique only for said at least one high-rate user, said means for processing producing a remaining signal that reduces the effects of said high-rate user; and means for decoding said remaining signal to detect said low-rate users.

25. A method for receiving a signal in a mixed-rate communication system, said communication system having at least one high-power user and a plurality of low-power users, said method comprising the steps of:

identifying said high-power users; and reducing the interference effects only for said at least one high-power user.

26. A method for receiving a signal in a mixed-rate communication system, said communication system having at least one high-rate user and a plurality of low-rate users, said method comprising the steps of:

identifying said high-rate users;

reducing the interference effects for said at least one high-rate user of said identified high-rate users, said reducing step producing a remaining signal in which the effects of said high-rate user are reduced; and decoding said remaining signal for at least one of said low-rate users without reducing the interference therefore in the same manner as for said at least one high-rate user.

* * * * *